United States Patent [19]

Szebenyi et al.

[11] 3,806,577

[45] Apr. 23, 1974

[54] PROCESS FOR EMBEDDING BIOLOGICAL MATERIALS IN PLASTIC

[75] Inventors: Andrew L. Szebenyi, Syracuse, N.Y.; Michael A. Gentile, 313 Hickok Ave., Syracuse, N.Y. 13206

[73] Assignee: said Gentile, by said Szenbenyi

[22] Filed: Feb. 28, 1972

[21] Appl. No.: 230,090

[52] U.S. Cl.................... 264/255, 156/57, 156/99, 156/245, 156/258, 161/5, 161/18
[51] Int. Cl............................ B28b 7/29, B28b 7/00
[58] Field of Search .......... 264/263, 271, 219, 255; 161/5, 18; 156/57, 99, 258, 245

[56] References Cited
UNITED STATES PATENTS

| | | | |
|---|---|---|---|
| 748,284 | 12/1903 | Karwowski | 27/22 |
| 2,917,856 | 12/1959 | Soloff | 161/18 |
| 3,613,265 | 12/1971 | Stern et al. | 161/18 X |

*Primary Examiner*—Edward G. Whitby
*Attorney, Agent, or Firm*—Cushman, Darby & Cushman

[57] ABSTRACT

A sheet of pre-polished cured transparent resin is placed face down and surrounded by a mold sidewall assembly, so it forms the mold's floor. The specimen is dipped in uncured, syrupy plastic resin and positioned in the mold upon the sheet. The mold is filled with sufficient catalyzed, uncured syrupy resin to embed the specimen. Upon curing of the block so formed, sheets of pre-polished cured resin are adhered to other faces of the block using catalyzed, uncured resin, applied carefully to eject air bubbles from between the block and the sheet. The edges of the sheet-covered block are trimmed to finish the embedded specimen. A preferred resin is polymethylmethacrylate. By using the method, much grinding and polishing of the embedded specimen is avoided. Typical blocks are multi-faceted solid prisms, such as ones based on rectangular faces.

4 Claims, No Drawings

PROCESS FOR EMBEDDING BIOLOGICAL MATERIALS IN PLASTIC

BACKGROUND OF THE INVENTION

Embedding of biological specimens in clear plastic resin for preservation and study is very laborious and time consuming, and it is also quite unhealthy because of the amount of buffing that has to be done to polish the surfaces of the blocks of molded clear plastic resin in which the specimens are embedded. It takes about 3 to 6 hours to obtain the high gloss needed, going through a number of different grades of abrasive materials. The end products are the perfect facial surfaces of the block, and a lot of dust on equipment, in the air, and in the lungs, even when protective masks are used. There are three or four major firms in the United States which use the technique, or sell materials for others to perform it.

In the most widely used prior art procedure, the specimen is kept in some preservative and water until the process is begun. The first step is to remove the water from the specimen, since this does not mix with the plastic usually used: polymethylmethacrylate-type (sold as Lucite, Plexiglas Perspex, and under other trade names). The dewatering is accomplished by the use of alcohol and/or glycerin. The glycerin is removed by acetone, and the latter is allowed to evaporate. The specimen is then placed into uncatalyzed liquid plastic and is allowed to be infiltrated by this material. Next a mold is prepared, treated with a mold release compound, such as silica gel, preventing the fusion between mold and plastic. A foundation layer is poured into the mold using liquid plastic to which catalyst has been added. The catalyst changes the liquid plastic into solid through a curing process. When this layer is firm enough, the specimen is transferred onto it and is allowed to anchor, i.e. to fuse with this layer. Then the mold is filled with liquid plastic and catalyst covering the specimen. The lot is put into an oven at about 120° F to hasten the action of the catalyst. The hard block, with the specimen in it, is then removed from the mold. At this stage, the plastic block has uneven and semi-opaque surfaces. The next step is to polish the surfaces of the block until they become even and transparent. This buffing and polishing procedure is the lengthy, and unhealthy part of the procedure.

SUMMARY OF THE INVENTION

A sheet of pre-polished cured transparent resin is placed face down and surrounded by a mold sidewall assembly, so it forms the mold's floor. The specimen is dipped in uncured, syrupy plastic resin and positioned in the mold upon the sheet. The mold is filled with sufficient catalyzed, uncured syrupy resin to embed the specimen. Upon curing of the block so formed, sheets of pre-polished cured resin are adhered to other faces of the block using catalyzed, uncured resin, applied carefully to eject air bubbles from between the block and the sheet. The edges of the sheet-covered block are trimmed to finish the embedded specimen. A preferred resin is polymethylmethacrylate. By using the method, much grinding and polishing of the embedded specimen is avoided. Typical blocks are multi-faceted solid prisms, such as ones based on rectangular faces.

At the core of the applicant's invention is fusing to the faces of the blocks as taken from the molds clear plastic sheets of the proper sizes. The facial joints formed are practically invisible, and substantially all buffing can be avoided. This new process reduces the time required to finish a block from the order of 3 to 6 hours to the order of 10 to 15 minutes. The process is utterly simple, and the finished blocks are beautiful.

At its simplest, the process contemplates that the rough, semi-opaque face of a piece of clear acrylic resin can be rendered smooth and transparent by cementing a pre-polished sheet of clear acrylic resin to the rough face, facewise, using clear acrylic resin as an alternative to grinding and polishing the rough, semi-opaque face to smooth transparency.

DETAILED DESCRIPTION OF THE PRESENTLY PREFERRED EMBODIMENT OF THE INVENTION

The process of the invention is typically identical with the above-description of the prior art process, down to the point of removing the specimen from the uncatalyzed plastic prior to the preparation of the foundation layer.

A supplier of typically useful uncured liquid acrylic resin and catalyst is Ward's Natural Science Establishment of Rochester, New York. Their materials, sold under the trade name "Bioplastic," are described on page 508 of Ward's 1971 catalog. These materials are supplied with instructions for mixing of catalyst and uncured resin and for curing, and are preferably used as directed in the present process. Of course, uncured resins which may be used in such a fashion could be used in the process.

The remainder of the new process proceeds as follows:

1. A piece of, e.g., 1/4 inch clear acrylic resin sheet is placed on a work table, and the protective paper is removed from its upper surface only. (Plexiglas, and other commercially sold sheets of pre-polished, clear acrylic resin sheets usually are furnished by the manufacturer with peelable protective paper temporarily adhered on both faces with, e.g., partly hydrolyzed polyvinyl acrylate or the like.) The size of the plastic sheet depends on the size of the specimen, or on the number of specimens which are to be embedded at the same time. This first piece of plastic sheet constitutes the foundation layer, already hard, pre-polished on its sides, or at least its lower side, by the manufacturer of the sheet. The pre-polished lower side is left with the protective paper still on at this stage. (In the prior art procedure, the foundation layer is poured and is allowed to harden overnight.)

2. The first plastic sheet is used as the bottom part of the mold. A frame, e.g., of wood, is placed around the foundation to form the mold's sidewalls. The inside surfaces of the mold sidewalls are treated with conventional mold release compound. The specimen is transferred from the uncatalyzed plastic onto this foundation and is allowed to anchor to it. Liquid acrylic plastic, to which conventional curing catalyst was added, is poured over the specimen, just covering it. The lot is cured in an oven in the usual manner.

3. The frame is removed. If more than one specimen was embedded at the same time, e.g., spaced, side-by-side, the large block is sawed into individual specimen blocks at this time. The top surface of each block is preferably rough sanded, e.g., using an aluminum oxide (or similar) sanding belt of grade 60. This takes about 1 minute. The surface becomes even and is totally opaque.

4. A piece of, e.g., 1/4 inch pre-polished, clear acrylic plastic resin sheet, the same size as the top surface of the block, is cut and the protective paper is removed on one side. A few drops of liquid acrylic plastic resin with catalyst is placed in the center of the rough sanded surface of the block, and the plastic sheet is lowered onto it at a slight angle to the horizontal. When the liquid, uncured, catalyzed plastic resin and the plastic sheet touch, the latter is carefully lowered onto the block. The plastic spreads out toward the edges, slightly overflowing. No air bubbles are formed. In addition, the liquid, uncured, catalyzed plastic enters into every groove on the rough surface and renders it totally clear. The lot is cured in the oven for about an hour to insure complete cohesion between the sheet, the block, and the resin applied to fuse the two together.

5. Next, the side faces of the block are rough sanded and are left in that state, or are treated in the same manner as the top face, using, e.g., 1/8th inch thick pieces of pre-polished, clear acrylic resin sheet. The size of these pieces are to be cut about 1/8th inch narrower and shorter than the comparable dimensions of the block to allow space for the overflow of excess liquid resin. The edges where the faces meet can then be rough sanded, e.g., at a 45° chamfer, for good appearance.

6. The protective paper is stripped from every face of the block. The block is now clean on all sides and is transparent, without any polishing, other than the above-mentioned rough finishing of the top and chamfering of the edges.

It should be apparent that the process could be used to encapsulate other objects than ones which had once been living, such as rocks, artifacts, and wares.

It should now be apparent that the process for embedding biological materials in plastic as described hereinabove possesses each of the attributes set forth in the specification under the heading "Summary of the Invention" hereinbefore. Because the process for embedding biological materials in plastic of the invention can be modified to some extent without departing from the principles of the invention as they have been outlined and explained in this specification, the present invention should be understood as encompassing all such modifications as are within the spirit and scope of the following claims.

What is claimed is:

1. A process for encasing an object in a block of cured plastic material which is transparent when smooth surfaced and at least semi-opaque when rough surfaced, comprising:
   a. fabricating a multi-faceted mold having at least one face thereof constituted by a pre-cured sheet of said plastic material, having an exterior smooth face;
   b. disposing in said mold, upon said sheet, the object to be encased, covered with an uncured liquid body of said plastic material;
   c. permitting the body to fuse with the sheet, and at least partly curing the body to connect the object to the sheet;
   d. filling the mold with a further body of said uncured liquid plastic material, sufficiently to envelop the at least partly cured body covering the object;
   e. at least partly curing the further body of plastic material and removing the thus created block from the remainder of the mold;
   f. interposing a quantity of said uncured liquid plastic material between another face of said block and another precured sheet of said plastic material having an exterior smooth face and uniting these elements facewise; and
   g. curing said quantity of plastic material to produce a block having an encased object which is viewable through at least the two faces of the block which were constituted from the exterior smooth faces of the pre-cured sheets of said plastic material.

2. The process of claim 1 further comprising: conducting steps (f) and (g) with respect to each rough surfaced face of the block, not already faced with a said pre-cured sheet.

3. The process of claim 2 wherein the block is finished by grinding a chamfer on all edges of the block where respective faces of said block meet.

4. The process of claim 3 wherein the smooth exterior surfaces of said sheets are initially provided with protective coverings temporarily adhered facewise thereto; and wherein the protective coverings are removed after all the precured plastic sheets have been united with the block.

* * * * *